United States Patent [19]

Becker et al.

[11] Patent Number: 5,902,646
[45] Date of Patent: May 11, 1999

[54] COATING MEDIUM, A METHOD OF PRODUCING MULTI-LAYER COATINGS AND THE USE OF THE COATING MEDIUM

[75] Inventors: Heinz Dietholf Becker, Bonn; Gerhard Bremer, Frechen; Werner Stephan, Wuppertal, all of Germany

[73] Assignee: Herberts GmbH, Wuppertal, Germany

[21] Appl. No.: 08/760,831

[22] Filed: Dec. 5, 1996

[30] Foreign Application Priority Data

Dec. 15, 1995 [DE] Germany .............. 195 46 899

[51] Int. Cl.$^6$ .............. B05D 1/36; B05D 1/38; C08G 18/34; C08F 2/44
[52] U.S. Cl. .............. 427/407.1; 522/104; 522/107; 522/108; 525/41
[58] Field of Search .............. 427/407.1, 409; 525/41; 522/107, 104, 108

[56] References Cited

U.S. PATENT DOCUMENTS

| | | | |
|---|---|---|---|
| 4,089,815 | 5/1978 | Reiter et al. | 260/2 R |
| 4,112,146 | 9/1978 | Lazear | 427/495 |
| 4,274,992 | 6/1981 | Buechler et al. | 260/32.8 R |
| 4,290,939 | 9/1981 | Bertsch et al. | 260/40 R |
| 4,347,111 | 8/1982 | Gehlhaus et al. | 204/159.16 |
| 4,391,686 | 7/1983 | Miller et al. | 204/159.15 |
| 4,409,077 | 10/1983 | Sakiyama et al. | 204/159.15 |
| 4,640,938 | 2/1987 | Romer et al. | 522/79 |
| 4,775,597 | 10/1988 | Birkmayer et al. | 427/317 |
| 5,068,125 | 11/1991 | Meixner et al. | 427/55 |
| 5,231,524 | 7/1993 | De Keyzer et al. | 427/284 |
| 5,420,205 | 5/1995 | Becker et al. | 525/168 |
| 5,425,970 | 6/1995 | Lahrmann et al. | 427/493 |
| 5,486,384 | 1/1996 | Bastien et al. | 427/385.5 |
| 5,677,379 | 10/1997 | Becker et al. | 525/101 |

FOREIGN PATENT DOCUMENTS

| | | |
|---|---|---|
| 2073159 | 1/1993 | Canada . |
| 003 002 | 6/1984 | European Pat. Off. . |
| 161 453 | 6/1988 | European Pat. Off. . |
| 154 924 | 7/1989 | European Pat. Off. . |
| 368 083 | 5/1990 | European Pat. Off. . |
| 41 22 765 | 1/1993 | Germany . |
| 42 26 520 | 2/1994 | Germany . |
| 43 15 830 | 11/1994 | Germany . |
| 43 21 533 | 1/1995 | Germany . |

OTHER PUBLICATIONS

Müller, Eugen, O. Bayer, H. Meerwein, K. Ziegler, "Methoden der Organischen Chemie". Houben–Weyl, 4th ed., v. 1412, 1961, pp. 1–5, 21–33, 40–44 (No Month).

*Primary Examiner*—Diana Dudash
*Attorney, Agent, or Firm*—Merchant Gould Smith Edell Welter & Schmidt

[57] ABSTRACT

This invention relates to coating media based on one or more styrene-free, unsaturated polyester resins, which contain A) one or more unsaturated polyesters obtainable by the reaction of
   a) 0.5 to 1.0 mole of at least one alpha,beta-ethylenically unsaturated dicarboxylic acid or the anhydride thereof,
   b) 0 to 0.5 mole of at least one aromatic, aliphatic and/or cycloaliphatic saturated dicarboxylic acid or the anhydride thereof,
   c) 0.4 to 0.8 mole of at least one aliphatic saturated dihydric alcohol,
   d) 0.5 to 1.2 mole of at least one hydroxy-functional allyl ether, B) one or more polyglycol diacrylates of general formula

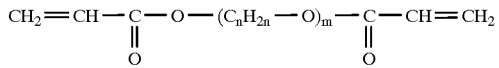

where $n=2–5$ and $m=2–5$, particularly dipropylene glycol diacrylate, C) one or more initiators, and optionally one or more organic solvents, one or more pigments and/or extenders, as well as accelerators, catalysts and/or customary lacquer additives.

8 Claims, No Drawings

COATING MEDIUM, A METHOD OF PRODUCING MULTI-LAYER COATINGS AND THE USE OF THE COATING MEDIUM

This invention relates to coating media, which are hardenable by a radical mechanism and which dry by oxidation, which are based on styrene-free unsaturated polyester resins and which are employed in particular as primer surfacer and stopper compositions for the coating of vehicles and vehicle parts.

Commercially available resins based on unsaturated polyesters (UP resins) generally contain styrene as a copolymerisable monomer. In this respect, the styrene content of the polyester resins is usually between 20 and 50%. The coating of automobiles for repair purposes and in mass production forms an important area of application for styrene-containing UP resins, wherein the polyester resins are predominantly used in stopper and primer surfacer compositions. These coating media are distinguished by their rapid drying and their good capacity for being rubbed down.

In most European countries, the maximum workplace concentration (MWC) of monostyrene is fixed at 50 ppm. In the Federal Republic of Germany, the maximum workplace concentration of monostyrene has been reduced to 20 ppm from its previous level of 100 ppm. During a typical application of products based on unsaturated polyester resins in the coating of vehicles, this MWC value can only be complied with by means of appropriate installation technology (workpiece ventilation by suction) or product technology. For the majority of coating operations, however, the corresponding installation technology cannot be implemented due to the relatively high capital costs involved. This means that it is only possible to achieve the requisite MWC values by way of corresponding product developments.

This can be achieved, for example, by the development of unsaturated polyester resins which are free from monomers, or by the use of other polymerisable monomers, which are different from styrene, as reactive thinners. EP-A-0 154 924 describes monomer-free stopper compositions which are produced from unsaturated dicarboxylic acids, aliphatic saturated alcohols and trimethylolpropane monoallyl ethers.

DE-A-41 22 765 describes other unsaturated polyesters which are free from copolymerisable monomers. These polyesters are characterised by a content of 5–70% by weight of octadienyl groups and a content of 10–65% by weight of ester radicals of unsaturated dicarboxylic acids.

DE-A-42 26 520 describes unsaturated polyesters which are hardenable by a radical mechanism and which are essentially composed of unsaturated dicarboxylic acids and oxyalkylated 2-butene-1,4-diol. These substances may contain 0–80% by weight of compounds which contain (meth) acryloyl groups or vinyl ether groups.

However, it is only possible to use these monomer-free, hardenable, unsaturated polyesters in stopper compositions with a high filler content. These polyester resins cannot be used for primer surfacer compositions, due to their defective appearance after spraying and due to their drying times being too long, and due also to their unsatisfactory rubbing-down capacity.

The binder vehicle systems described in DE-A-43 21 533 contain unsaturated polyesters which are obtained from unsaturated dicarboxylic acids, hydroxy-functional allyl ethers and ethylenically unsaturated compounds containing an oxirane group in their molecule. These compositions are suitable for primer surfacer and stopper compositions, but have the disadvantage that surface defects in the form of blister formations occur during IR drying.

DE-A-43 15 830 describes unsaturated polyester resins for low-emission coating and sealing materials; these contain 40–90% by weight of a polyester comprising acrylate or methacrylate terminal groups, 10–60% by weight of an acrylate or methacrylate comonomer with a boiling point of at least 150° C., and 0–50% by weight of other high-boiling monomers. These polyester resins are used for the coating and sealing of parts of buildings, such as roofs, terraces, foundations and roof guttering, against the effects of water and aggressive media, and have properties which correspond to the specific application, e.g. a defined tensile elongation. These polyester are unsuitable as a resin base for primer surfacer and stopper compositions for the coating of vehicles.

The object of the present invention was to provide low-emission, styrene-free coating media which can be used in particular as primer surfacer and stopper compositions for the coating of vehicles, especially for the coating of vehicles for repair purposes, and which have good properties which are comparable with those of the styrene-containing coating media which were customary hitherto. The object was also for the coating media to be capable of being applied in thick coats and to dry rapidly, and for them also to cover the substrate well and reliably and to be capable of being rubbed down without problems.

This object is achieved by coating media containing

A) one or more unsaturated polyesters obtainable by the reaction of
 a) 0.5 to 1.0 mole of at least one alpha,beta-ethylenically unsaturated dicarboxylic acid or the anhydride thereof,
 b) 0 to 0.5 mole of at least one aromatic, aliphatic and/or cycloaliphatic saturated dicarboxylic acid or the anhydride thereof,
 c) 0.4 to 0.8 mole of at least one aliphatic saturated dihydric alcohol,
 d) 0.5 to 1.2 mole of at least one hydroxy-functional allyl ether, B) one or more polyglycol diacrylates of general formula

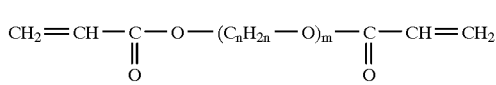

where n=2–5 and m=2–5,

C) one or more initiators, and
 optionally one or more organic solvents, one or more pigments and/or extenders, as well as accelerators, catalysts and/or customary lacquer additives.

The coating medium preferably contains 40–90% by weight of unsaturated polyesters and 10–60% by weight of polyglycol diacrylates, wherein the percentages by weight should add up to 100.

The unsaturated polyesters which can be used as component A) in the coating media according to the invention preferably have a number average molecular weight ($M_n$) of 500–1200 and preferably have an acid number of 5–50 mg KOH/g. Their viscosity is preferably 2000–5000 mPa.s.

The polyesters to be used according to the invention can be produced by known methods, e.g. by the melt- or azeotropic esterification of alcohols and acids or of derivatives thereof which are capable of undergoing esterification. Examples of methods such as these are described in "Methoden der organischen Chemie" (Houben-Weyl), 4th Edition, Volume 14/2, 1961, pages 1–5, 21–33, 40–44. In order to protect the polyesters to be used according to the invention from premature crosslinking it is advantageous to add 0.001 to 0.1% by weight of polymerisation inhibitors during the production of the polyesters; p-benzoquinone is very suitable as a polymerisation inhibitor, for example.

Examples of components a) which are suitable for the production of the polyesters to be used according to the invention include alpha,beta-ethylenically unsaturated dicarboxylic acids or anhydrides thereof containing 4–10 C atoms in their molecule. Examples of these include maleic acid, maleic anhydride, fumaric acid, itaconic acid, citraconic acid and mesaconic acid. Maleic acid, maleic anhydride and fumaric acid are preferred. 5

Examples of substances which can be used as component b) include aromatic saturated dicarboxylic acids, such as phthalic acid, and iso- and terephthalic acids for example, aliphatic saturated dicarboxylic acids such as succinic acid, adipic acid and sebacic acid for example, and cycloaliphatic saturated dicarboxylic acids, such as hexahydro- and tetrahydrophthalic acid for example. Examples of component c) include saturated aliphatic dihydric alcohols containing 2–8 carbon atoms in their molecule. Examples thereof include ethylene glycol, 1,2-propanediol, 1,3-propanediol, 1,4-butanediol, 1,3-pentanediol, 1,6-hexanediol and 2-ethylhexanediol-1,6. Ethylene glycol and 1,2-propanediol are preferred.

Diols and/or polyols which are partially etherified with allyl alcohol are used as component d), for example. Examples of suitable diols and polyols include straight chain or branched aliphatic diols and polyols. These are preferably defined monomeric compounds. The polyols contain 3 –6 OH groups, for example, preferably 3–5 OH groups. Examples of component d) include trimethylolethane monoallyl ether, trimethylolethane diallyl ether, trimethylolpropane monoallyl ether, trimethylolpropane diallyl ether, pentaerythritol monoallyl ether, pentaerythritol diallyl ether, pentaerythritol triallyl ether and glycerol monoallyl ether. Trimethylolpropane monoallyl ether and trimethylolpropane diallyl ether are preferably used.

Examples of unsaturated polyesters which can be used as component A) are described in EP-A-0 154 924 and in EP-A-0 368 083.

Polyglycol diacrylates of general formula

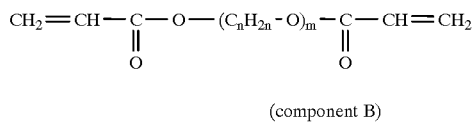

(component B)

are used as copolymerisable monomers in the coating medium according to the invention. The preferred polyglycol diacrylates are diethylene glycol diacrylate, dipropylene glycol diacrylate, triethylene glycol diacrylate and tripropylene glycol diacrylate. Dipropylene glycol diacrylate is particularly preferred.

Hardening of the unsaturated polyester resins which are used according to the invention is effected via a radical hardening mechanism. The coating media according to the invention therefore contain initiators (component C) for radical polymerisation. Examples of the initiators which are used include peroxides, optionally in combination with customary accelerators, e.g. metal salts, and optionally in combination with catalysts. The usual radical initiators may be used as the peroxides. The preferred peroxides are tert.-butyl hydroperoxide, cumene hydroperoxide, 2,5-dimethylhexane-2,5-dihydroperoxide, cyclohexanone hydroperoxide, methyl ethyl ketone hydroperoxide and diisopropylbenzene monohydroperoxide. The peroxides are most preferably used in amounts of 1–1.5% by weight with respect to the coating medium as a whole. The peroxides may also be used in desensitised form. Phthalic acid esters are examples of customary desensitising agents. 2–3% by weight of the desensitised peroxides are generally used when employed in desensitised form.

In principle, it is also possible to harden the coating media according to the invention by actinic light, for example by UV light. Customary photoinitiators are added to the coating media for this purpose. Suitable photoinitiators are those which absorb in the wavelength range from 190 to 400 nm, for example. Examples thereof include chlorine-containing aromatic compounds e.g. those described in U.S. Pat. No. 4,089,815, aromatic ketones as described in EP-A-0 003 002 and EP-A-0 161 453, and hydroxyalkyl phenones as described in U.S. Pat. No. 4,347,111. The photoinitiators may be used in amounts of 1–5% by weight with respect to the coating medium, for example.

Accelerators which are customary for radical reactions are employed as accelerators, such as metal salts in particular, e.g. cobalt and manganese salts of acids such as linseed fatty acid, tall oil and soya fatty acids and acetic acid for example. The accelerators are used in the usual amounts, for example from 0.01 to 1% by weight with respect to the coating medium as a whole.

The catalysts used are those catalysts which are suitable for radical reactions. Aromatic amines are preferred in this respect, such as N,N-dimethylaniline, N,N-diethylaniline, N,N-dimethyl-p-toluidine, oxyethylaniline, 4-dimethylaminobenzoic acid or acidic CH compounds such as acetylacetone or acetoacetic ester. The catalysts can be used in amounts of 0–2% by weight with respect to the coating medium as a whole, for example.

The coating media according to the invention may contain small amounts of organic solvents. Examples of organic solvents which can be used as those which are customary for the formulation of primer surfacer or stopper compositions. Examples thereof include esters such as butyl acetate and ethyl acetate, as well as ketones such as methyl ethyl ketone. In general, the solvents are preferably used in amounts of not more than 5% by weight with respect to the final coating medium.

The coating media according to the invention may also contain pigments and/or extenders. These materials are used in amounts of 30–80% by weight with respect to the final coating medium for example. Customary organic and inorganic pigments and extenders which are suitable for coating media can be used. Examples of pigments which are preferably used in stopper compositions and primer surfacer compositions include inorganic pigments such as iron oxide pigments and titanium dioxide. Examples of extenders which are preferably used in stopper and primer surfacer compositions include inorganic extenders in particular, such as various types of french chalk, silicon dioxides, magnesium silicates, aluminium silicates and barium sulphates.

Customary lacquer additives may also be added to the coating media. These may include thixotropic agents, anti-settling agents, degassing and levelling agents and customary stabilisers. Customary polymerisation inhibitors or anti-oxidants may be added to the coating media in order to stabilise the unsaturated polyesters. Examples thereof include hydroquinone, resorcinol, phenothiazine and p-benzoquinone. The amounts added are from 10 to 1000 ppm with respect to the coating medium as a whole.

All the usual mixing units, such as dissolvers, planetary mixers or forcibly actuated kneaders, can be used for the production of the coating media according to the invention.

The coating media according to the invention are preferably prepared so that they at first contain no initiators. The initiators, e.g. the peroxides, are not added until just before application.

The coating media according to the invention are particularly suitable for producing stopper and primer surfacer coats of an air-drying or force-dried multi-layer coating. Good properties are obtained with the styrene-free coating media according to the invention, and these properties are comparable with those obtained hitherto with customary styrene-containing materials. The coatings obtained with the coating media according to the invention give a very good appearance after spraying and are very resistant to run-off (staying power on vertical surfaces). The coatings can be rubbed down without problems after a drying time of 3–4 hours. Drying can also be effected overnight at room temperature, however, and oven drying at 60° C. is possible (drying time 30 minutes). The time required for hardening throughout can be shortened to 10–15 minutes by means of IR drying. However, the coating media can also be hardened at temperatures of 80–100° C., for example. The coating media can be applied as primer surfacer compositions to give dry coat thicknesses up to 500 μm.

Application can be effected in the usual manner, depending on the purpose of use and on the viscosity of the material used. Thus materials of higher viscosity, such as stopper compositions for example, can be applied by brushing or doctor blade. Materials of lower viscosity such as primer surfacer compositions can be applied by brushing or by spray application.

The coating media according to the invention can be applied as stopper or primer surfacer compositions to very different substrates during the production of multi-layer coatings. Examples of suitable substrates include various metallic substrates, such as steel or zinc for example, metallic substrates provided with one or more coatings, or plastics substrates also. After drying and rubbing down, the coating media according to the invention can be overcoated with customary covering lacquers without problems. The latter may be single coat covering lacquers, e.g. those based on two-component acrylate/polyisocyanate compositions, or may comprise customary base coat/clear coat structures. Overcoating with solvent-based or water-thinnable coating media is possible. The coating media according to the invention are particularly suitable for the coating of vehicles and for industrial coating operations, particularly for coating for repair purposes in the motor vehicle industry.

The present invention also relates to methods of producing multi-layer coatings and to the use of the coating media for producing multi-layer coatings, wherein stopper and primer surfacer coats are produced in particular by the coating media according to the invention.

The following examples are intended to explain the invention. All data are given on a weight basis.

EXAMPLE 1

Production of an unsaturated polyester 1.0 mole maleic anhydride, 0.7 mole ethylene glycol and 1.0 mole trimethylolpropane monoallyl ether were subjected to melt condensation at 160–180° C. under a flow of nitrogen, in a three-necked flask fitted with a stirrer, water separator trap and reflux condenser, until an acid number of 19 mg KOH/g was obtained. The product obtained had a viscosity of 3500 mPa.s.

Production of a primer surfacer 36 parts of the above unsaturated polyester, 0.6 parts of a commercially available 1% solution of hydroquinone and 8 parts of dipropylene glycol diacrylate were introduced into a clean vessel and stirred. 0.5 parts of a commercially available thixotropic agent, 38 parts of french chalk, 0.3 parts of iron oxide pigments and 6.0 parts of titanium dioxide were subsequently sprinkled in and dispersed, with stirring. Thereafter, 0.6 parts of a commercially available liquid accelerator, 4 parts of ethyl acetate and 6 parts of dipropylene glycol diacrylate were stirred in.

COMPARATIVE EXAMPLES 1–3

The procedure employed was the same as that of the above example. Oligotriacrylate, oligotetraacrylate and butanediol dimethacrylate were used, respectively, instead of dipropylene glycol diacrylate. Shortly before application, 2% by weight, with respect to the coating medium as a whole, of a commercially available peroxide solution were added in each case to all the primer surfacers.

EXAMPLE OF APPLICATION

The primer surfacer compositions corresponding to Example 1 and to comparative examples 1–3, as well as a customary styrene-containing polyester primer surfacer to provide a further comparison, were applied to steel panels by means of spray application to give a dry coat thickness of 500 μm. The results of their assessment as regards lacquer technology are presented in the following Table:

| | Viscosity | Processing | Staying power | Drying/ rubbing down capacity | Stability on storage | Pot life (minutes) |
|---|---|---|---|---|---|---|
| Polyester primer surfacer containing styrene | 2 | 2 | 2 | 2 | 2 | 30 |
| Example 1. Polyester primer surfacer with DPGDA | 2 | 2–3 | 2 | 2–3 | 2 | 30 |
| Comparative example 1. Polyester primer surfacer with OTA | 4 | 4 | 4 | 2–3 | 3–4 | 30 |
| Comparative example 2. Polyester primer surfacer with PPTTA | 3 | 3 | 3 | 3 | 3–4 | 30 |
| Comparative example 3. Polyester primer surfacer with BDDMA | 3 | 3 | 3 | 2–3 | 4 | 30 |

DPGDA: dipropylene glycol diacrylate
OTA: oligotriacrylate (MW 480)
PPTTA: oligotetraacrylate (MW 560)
BDDMA: butanediol dimethacrylate
Assessment: 2-good 3-satisfactory 4-unsatisfactory

We claim:
1. A coating medium based on unsaturated polyester resins, comprising:
A) one or more unsaturated polyesters which are the polymerization product of,
  a) about 0.5 to about 1.0 mole of at least one alpha, beta-ethylenically unsaturated dicarboxylic acid or the anhydride thereof,
  b) 0 to about 0.5 mole of at least one aromatic, aliphatic and/or cycloaliphatic saturated dicarboxylic acid or the anhydride thereof,
  c) about 0.4 to about 0.8 mole of at least one aliphatic saturated dihydric alcohol, d) about 0.5 to about 1.2 mole of at least one hydroxy-functional allyl ether,

B) dipropylene glycol diacrylate,

C) one or more initiators, and wherein the coating medium is styrene-free.

2. A coating medium according to claim 1, wherein the weight percentages of the components are about 40–about 90% by weight of unsaturated polyesters and about 10–about 60% of the dipropylene glycol diacrylate and effective weight percentage of component C, wherein the sum of the components amounts to 100% by weight.

3. A coating medium according to claim 1 wherein the polyesters used as component A) have a number average molecular weight ($M_n$) of about 500–about 1200 and an acid number of about 5–about 50 mg KOH/g.

4. A coating medium according to claim 1 wherein the polyesters used as component A) have a viscosity of about 2000–about 5000 mPa.s.

5. A coating medium according to claim 1 wherein it contains about 1.0–about 1.5% by weight, with respect to the coating medium as a whole, of peroxides as an initiator.

6. A method of producing a multi-layer coating by the application of a plurality of hardenable coating layers to a substrate, comprising applying the coating medium according to claim 1 to the substrate to produce a stopper or primer surfacer layer.

7. A method of producing a multi-layer coating comprising applying the coating medium of claim 1 to a substrate to produce at least one of the layers of the multi-layer coating.

8. A coating medium according to claim 1 further comprising a coating medium additive selected from the group consisting of one or more organic solvents, one or more pigments, one or more extenders, one or more accelerators, one or more catalysts, one or more lacquer additives, and any combination thereof.

* * * * *